No. 723,190. PATENTED MAR. 17, 1903.
G. L. WALLIS.
CULTIVATOR.
APPLICATION FILED JULY 24, 1902.
NO MODEL.
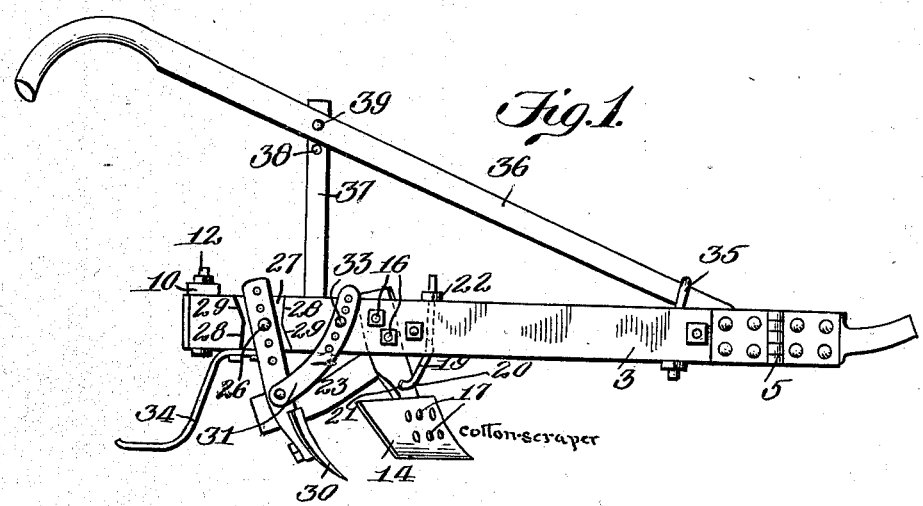
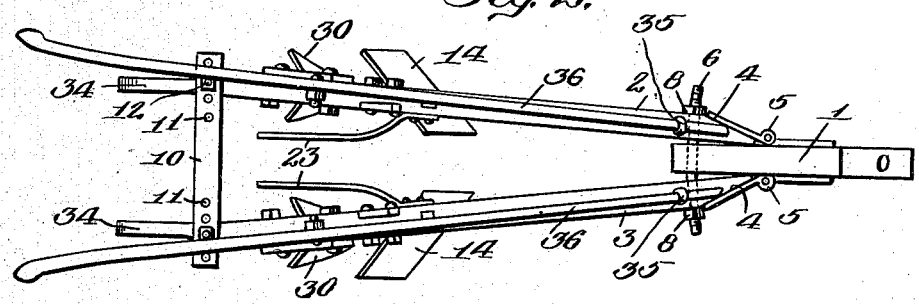
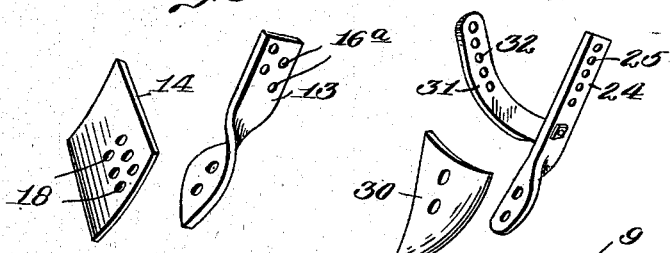
Witnesses
Inventor
George L. Wallis
By James L. Norris
Atty.

UNITED STATES PATENT OFFICE.

GEORGE L. WALLIS, OF MASTODON, MISSISSIPPI, ASSIGNOR OF ONE-HALF TO CASWELL PRESSLER, OF PLEASANTGROVE, MISSISSIPPI.

CULTIVATOR.

SPECIFICATION forming part of Letters Patent No. 723,190, dated March 17, 1903.

Application filed July 24, 1902. Serial No. 116,838. (No model.)

*To all whom it may concern:*

Be it known that I, GEORGE L. WALLIS, a citizen of the United States, residing at Mastodon, in the county of Panola and State of Mississippi, have invented new and useful Improvements in Cultivators, of which the following is a specification.

This invention relates to cultivators for cultivating cotton, corn, and other growing crops planted in either straight, curved, or circular rows as contradistinguished from crops planted broadcast; and it has for its object to improve and simplify the construction and render more efficient the operation of such type of agricultural implements.

One of the important objects of the invention is to facilitate and improve the adjustment of the several parts of the cultivator to accommodate it to different kinds of crops and to adapt it to cultivating such crops at different periods of their growth and under different conditions.

To these ends my invention consists in the features and in the construction, combination, and arrangement of parts, hereinafter described, and particularly pointed out in the claims following the description, reference being had to the accompanying drawings, forming a part of this specification, wherein—

Figure 1 is a view in side elevation of my improved cultivator. Fig. 2 is a top plan view thereof. Fig. 3 is a detail perspective view of one of the scrapers and standards, the two parts being shown separated. Fig. 4 is a similar view of one of the shovels, the standard, and brace; and Fig. 5 is a detail perspective view of one of the cultivator-beams.

Like characters refer to like parts in the figures of the drawings.

Referring to the drawings, the numeral 1 indicates a tongue constructed for the attachment thereto of a suitable draft device, and to said tongue are connected the forward ends of two cultivator-beams 2 and 3. Said cultivator-beams are beveled at their front ends, as at 4, and to each of said beveled ends is secured one member of a hinge 5, the other member of which is attached to the side of the tongue 1, it being understood, of course, that the hinges 5 are attached to the opposite sides of the tongue 1. Fixed in and extending transversely through the rear end of the tongue 1 is a double-ended bolt 6, preferably slightly curved in cross-section, said bolt projecting through perforations 7, formed in the forward ends of the cultivator-beams and preferably having nuts 8 arranged on its opposite ends. By hinging the cultivator-beams in the manner described they may be moved laterally toward and from each other, or, in other words, their rear ends may be spread apart or drawn toward one another, the hinges acting as fulcrums upon which they turn. The bolt 6 operates to receive the end thrust of the cultivator-beam when the cultivator is in operation and prevent the strain from coming on the hinges. In the rear end of each one of the cultivator-beams is formed a suitable perforation or bolt-hole 9, and straddling the rear ends of both of said beams is an adjustable brace or bar 10. The brace 10 consists of a flat metallic bar provided at each end with a plurality of perforations 11, any two of which are adapted to register at the same time with the bolt-holes 9 in the cultivator-beams. Bolts 12 pass through the perforations 11 and through the bolt-holes 9 and serve to hold the cultivator-beams rigidly in the position to which they may be adjusted. Bolted to the inner sides of the beams 2 and 3 are two standards 13, which carry at their lower ends scrapers 14. Forwardly and downwardly inclined mortises 15 are preferably formed on the inner sides of the cultivator-beams, into which the upper ends of said standards fit, and each of the latter is rigidly secured to its beam by two bolts 16, which pass through the standards and the beams and are provided with nuts for firmly drawing up the standards to their seats in the beam. As shown in the drawings, the lower forward ends of the standards 13 are flattened and enlarged and are given a torsional twist outward or in opposite directions, and to said flattened lower portions of the standards are secured the scrapers 14. Each of the scrapers is secured to its standard by two bolts 17, which pass through the scraper and through the standard, and each of said scrapers is provided with a plurality of duplex bolt-holes 18, so that by passing the bolts through either one or the other of said sets of bolt-holes the scrapers may be adjusted toward or from each other. The upper ends of the standards are also provided with a plurality of duplex bolt-holes 16ª, so that by shifting the bolts 16 from one set of said bolt-holes to the others the standards, and with them the scrapers, may be raised or lowered, and owing to the positions of the bolt-holes and the inclinations of the mortises 15 the scrapers may be raised and lowered and may be adjusted at different angles relatively to the soil. Passing through each of the cultivator-beams is a brace-rod 19, the lower end of which is hook-shaped, as at 20, and engages a perforation 21, formed in the corresponding scraper-standard. The upper end of each of said rods is threaded and has screwed thereon a nut 22, said rods operating to brace the scraper-standards and resist the rearward thrust of the scrapers, and when the standards are adjusted vertically or angularly in the manner before described the nut may be adjusted to assist in holding the standards and scrapers in their adjusted positions. Attached to the inner sides of the cultivator-beams are fenders 23, each consisting of a flat metallic blade which projects downwardly and rearwardly from the cultivator-beam in the rear of the scrapers and the plows to be hereinafter described. Attached to the outer sides of the rear ends of the cultivator-beams are plow-standards 24, each of said standards being provided with a plurality of bolt-holes 25, through any one of which may be passed the bolt 26 and passes also through the adjacent cultivator-beam. Mortises 27 are formed in the outer sides of the cultivator-beams, each of said mortises having two vertical and parallel walls 28 and two forwardly and downwardly inclined and parallel walls 29. The upper ends of the plow-standards 24 are fitted in said mortises, and owing to the inclination of the walls 29 they have a swinging movement about the bolts 26 as fulcrums when the standards are released. By passing the bolts 26 through one or the other of the bolt-holes 25 the standards 24 may be vertically adjusted. To the lower end of each of the standards 24 is attached a shovel or cultivator-blade 30. To each of the standards 24 is attached one end of a brace 31, said brace consisting of a slightly-curved flat metallic bar, the upper end of which is provided with a plurality of bolt-holes 32, and passing through any one of the said bolt-holes and through the adjacent cultivator-beams is a bolt 33. By causing the bolt to pass through one or another of said bolt-holes the inclination of the plow-standards and the shovels carried thereby may be adjusted as desired. Bolted to the under side of the rear end of each of the cultivator-beams are gage-runners 34, which consist of a flat metallic bar formed of resilient material which projects vertically downwardly and slightly rearward from the cultivator-beam and at its lower free end is bent to an approximately horizontal position. Fixed in the upper forward portions of the cultivator-beams are bails 35, into which are fitted the forward ends of handles 36, and said handles being secured near their rear ends to vertical standards or supports 37, which at their lower ends are mortised into the rear ends of the cultivator-beams. Each of the standards 37 is provided with a plurality of bolt-holes 38, and passing through any one of said holes and the corresponding handle is a bolt 39. By shifting the bolts 39 from one set of bolt-holes to another the height of the handles may be adjusted.

The operation of my improved cultivator is as follows: In cultivating cotton the scrapers and shovels are adjusted to straddle the row of cotton-plants, and as the implement is drawn over the row the scrapers first operate to scrape the earth away from each side of the row of plants and cut away the weeds and other foreign growth and to scrape the clods, sticks, and trash away from the roots of the growing plants. The shovels follow closely in the rear of the scrapers and being set to one side of the scrapers travel in the furrows between the drills or rows and lift up and throw onto each side of the rows and over the roots of the growing plants fresh earth. The scrapers and shovels thus operate to simultaneously cultivate both sides of the rows. The fenders operate to protect the plants and prevent the earth from being thrown up too closely about the stems of the plant, while the gage-runners operate to gage the depth to which the shovel-plows penetrate the soil. By adjusting the plow-standards vertically in the manner before described the implement may be set to cause the plows to plow to any desired depth, the gage-runners operating thereafter to cause the plows to run at the depth to which they may be adjusted. When it is desired to have the plows run comparatively flat or to merely skim the earth, the braces 31 should be adjusted upward, thus presenting the plows to the soil in nearly a horizontal position. The scrapers may also be adjusted vertically and at different inclinations by adjusting their attaching-bolts in the manner before described and also adjusting the brace-rods 19, and the scrapers may be also adjusted toward and from each other by shifting the bolts 18 from one set of bolt-holes to another. In cultivating corn two horses are hitched to the tongue, so that they may travel on each side of the growing row. When working cotton for the first time, a single horse is hitched to the tongue and walks in the drill or row. In cultivating cotton after it has been thinned two horses are hitched to the tongue, as in cultivating corn. By shifting the bolts 12 from one set of bolt-holes to another in the brace-rods 10 the cultivator-beams will be separated or drawn closer together to adjust the shovels and scrapers toward and from each other, whereby the cultivator may be adapted to cultivate different kinds of crops and for cultivating crops at different periods of their growth and under different circumstances. By means of the various adjustments described the implement may be very quickly and readily adapted for cultivating crops of all kinds that are planted in drills or rows.

It will of course be understood that the plows 30 may be of any size desired or most suitable for the purpose for which they are to be used. When it is desired to work the row of growing plants and the "middle" or furrow between two rows at the same time the scrapers and their standards should be removed and the two plow-beams so adjusted that the right-hand plow will run in close proximity to one row of growing plants and the left-hand plow will run midway between said row and the adjacent row on the left.

Having described my invention, what I claim is—

1. In a cultivator, the combination with a tongue, of two cultivator-beams beveled on the outer edges of their front ends, hinges fixed to said beveled ends and to the sides of the tongue, a curved rod projecting laterally from the opposite side of the tongue in rear of the hinges and through perforations in the cultivator-beams, nuts on the outer ends of the rod, a single rigid brace-bar arranged transversely to the rear ends of the beams provided at each of its ends with a plurality of perforations, and bolts fitted in the rear ends of the beams and interchangeable in said perforations, substantially as described.

2. In a cultivator, the combination with a tongue, of two cultivator-beams hinged at their forward ends to the tongue, means for holding said beams in their adjusted positions, independently-adjustable scrapers and shovel-plows carried by the beams, the shovel-plows being arranged in rear of the scrapers, and fenders carried by the beams and arranged to straddle the row of growing plants, substantially as and for the purpose specified.

In testimony whereof I have hereunto set my hand in presence of two subscribing witnesses.

GEORGE L. × WALLIS.
his mark

Witnesses to the mark of George L. Wallis:
W. H. WALL,
W. D. WALL.